(No Model.)

T. McMILLEN.
BARREL HEAD CUTTER.

No. 352,766. Patented Nov. 16, 1886.

WITNESSES:

INVENTOR:
T. McMillen
BY Munn & Co.
ATTORNEYS.

UNITED STATES PATENT OFFICE.

THOMAS McMILLEN, OF NEW ORLEANS, LOUISIANA, ASSIGNOR TO HIMSELF AND PHILIP HIRSCH, OF SAME PLACE.

BARREL-HEAD CUTTER.

SPECIFICATION forming part of Letters Patent No. 352,766, dated November 16, 1886.

Application filed October 14, 1885. Serial No. 179,860. (No model.)

*To all whom it may concern:*

Be it known that I, THOMAS McMILLEN, of New Orleans, in the parish of Orleans and State of Louisiana, have invented a new and Improved Barrel-Head Cutter, of which the following is a full, clear, and exact description.

My invention has reference especially to that class of barrel-head cutters illustrated in United States Letters Patent No. 166,873, dated August 17, 1875, but is equally adaptable to all machines for the purpose in which the saw-mandrel is made to swing toward and from the barrel-head under treatment, in order to cut the same in oval shape. In these machines a flat clamping-disk has generally been employed, against which the barrel-head is held, the saw-mandrel being swung toward and from the same twice during each revolution, thus cutting the head oval, so that the after-shrinkage of the barrel-head in the direction across the grain would render the head true; but the beveling of the head performed during this operation has heretofore been inaccurate, owing to the change of position of the saw or cutter relatively to the head during the cutting operation, the bevel being less acute on the sides parallel to the grain of the wood; and to remedy this I have provided the improvement herein set forth.

The invention consists in forming the clamping-disk against which the barrel-head is held with a warped or curved surface, so that in applying the head thereto the same will be bent or concaved transversely to the grain and in the direction of its greatest diameter, making the projected diameters nearly equal, so that the effect of the varying diameter upon the barrel-head will be counteracted, as hereinafter clearly described.

Reference is to be had to the accompanying drawings, forming a part of this specification, in which similar letters of reference indicate corresponding parts in all the figures.

Figure 1:
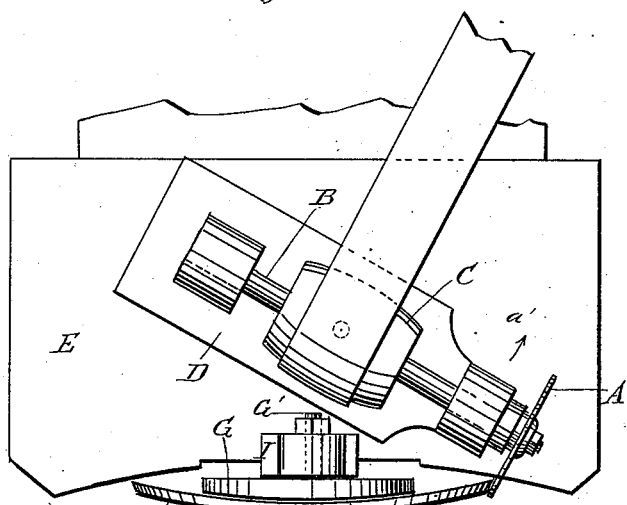
Figure 3:
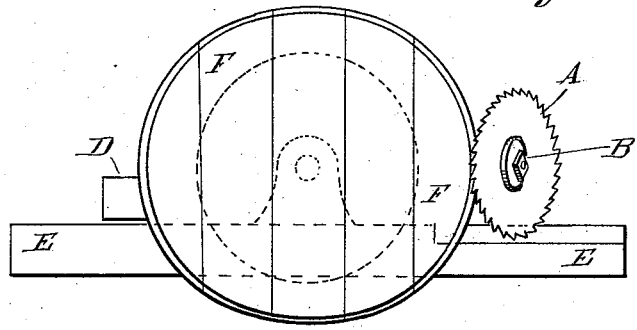
Figure 2:
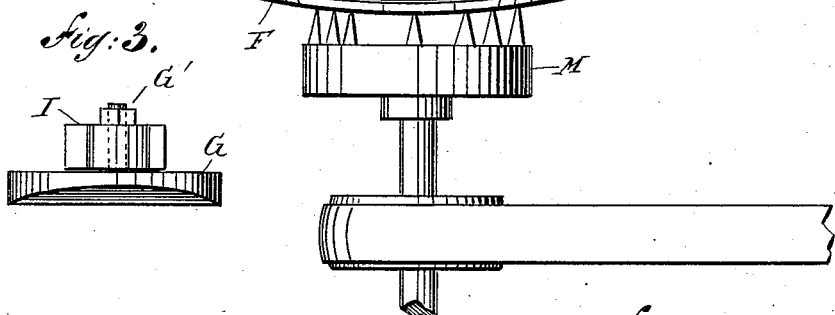

Figure 1 is a plan view of a barrel-head cutter of usual construction having my improvement applied, and showing as much of the details as is necessary to illustrate the invention. Fig. 2 is a face view of the barrel-head and saw or cutter in position. Fig. 3 is an edge view of the curved clamping-disk against which the head is held.

The circular saw A, of the construction illustrated, or the cutter shown in Patent No. 166,873, before referred to, is mounted rigidly on the end of the shaft or mandrel B, revolving in suitable bearings on the movable saw frame or carrier D, and carrying the belt-pulley C, by which the saw is rapidly rotated from any suitable power. The saw-carrier D is pivoted at or near its center to the supporting-table E, and approximately in line with the journal G' of the head-clamping disk G, which journal revolves in a bearing, I, on the table E.

The barrel-head F is pressed against the clamping disk G by means of a chuck, M, which may be provided with spring-acted jaws, as shown in the aforesaid patent, the construction so far described being substantially the same as therein illustrated.

The saw frame or carrier D is normally inclined to the face of the clamping-disk, so that the rotary saw or cutter A will form the head F with the required bevel, and it may be adjustable to and from the disk-journal G' to accommodate heads of different sizes, as shown in the patent referred to.

The tendency of the movable saw to form the head with a varying bevel is overcome by employing a clamping-disk, G, formed with a convex face, as shown clearly in Figs. 1 and 3, so that when the head is pressed against the same by the yielding chuck-jaws it will be concaved transversely to the grain of the wood; and it further may be held from rotation on the disk G by suitably-arranged points or teeth, as in the patent mentioned.

The saw-frame D may be turned on its pivot, so as to swing the saw A to and from the head F twice during each revolution of the same in any suitable manner, as that illustrated in the Holmes patent, No. 166,873, in which an oval cam on the chuck-shaft operates the saw-frame through suitable connections, the chuck-shaft being slowly revolved by worm-gear; or the chuck-shaft may be driven by a slowly-moving belt, as illustrated in Fig. 1.

Without my improvement, when the saw is to cut the head at its largest diameter or on the side parallel to the grain, it is swung outward, as indicated by the arrow a', to the required extent by its connection with the oval cam on the chuck-shaft, and the angle of the saw relatively to the head being thus changed, a less acute bevel is there formed; but by curving the head at those points inward toward the saw-frame, as shown clearly in Fig. 1, the inclination of the head is changed correspondingly with that of the saw, so that the angle of bevel remains the same. The action is similar when the saw is swung inward to cut the head at its smallest diameter. The relative inclination of the saw to the outer part of the head remains unaltered, thus forming a uniform bevel on the edge of the head.

Any suitable appliances may be used for operating the swinging saw-frame from the chuck-shaft, or the frame may be operated at proper intervals independently thereof, the improvement consisting in employing a warped head-holding disk in conjunction with a movable saw-mandrel, so that the inclination of that part of the head being cut is changed to correspond with the varying inclination of the saw.

Having thus fully described my invention, I claim as new and desire to secure by Letters Patent—

In a barrel-head cutter, the combination, with a rotary disk having its face curved on a convex line in one direction only, and against which the head is held, of a saw or cutter mounted on a shaft journaled in a frame pivoted to turn in a plane parallel with the plane of the disk-shaft, substantially as specified.

THOMAS McMILLEN.

Witnesses:
ANDRÉ DORIOCOURT, Jr.,
H. SAUVIAC.